Jan. 19, 1971  C. J. REUSSER  3,556,886
PALLET BOARD USING POLYSTYRENE FOAM SPACERS BETWEEN
CORRUGATED CARDBOARD
Filed April 25, 1968
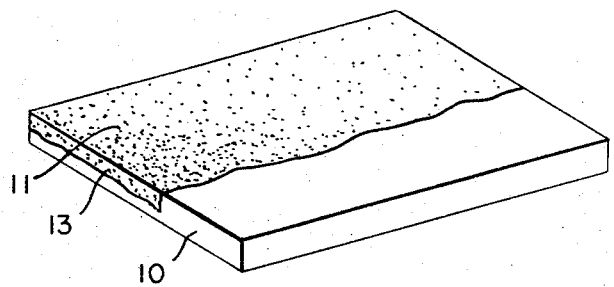
FIG__1
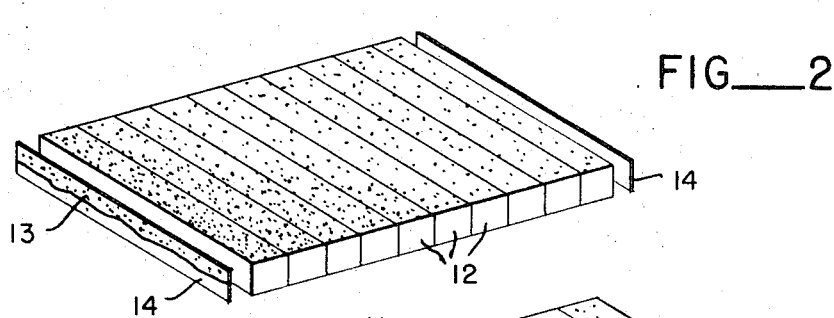
FIG__2
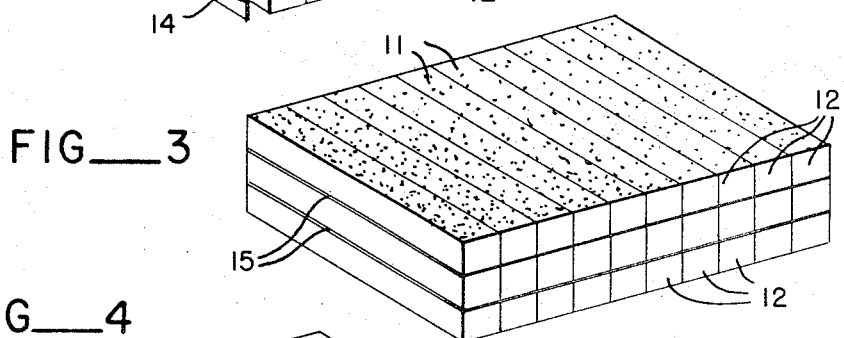
FIG__3
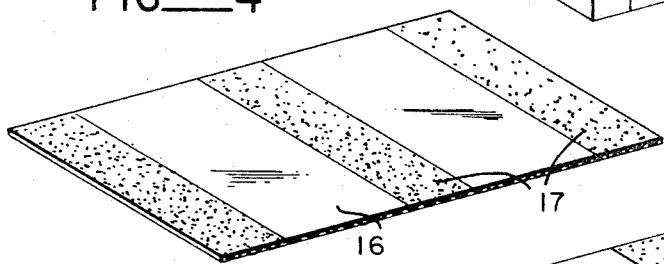
FIG__4
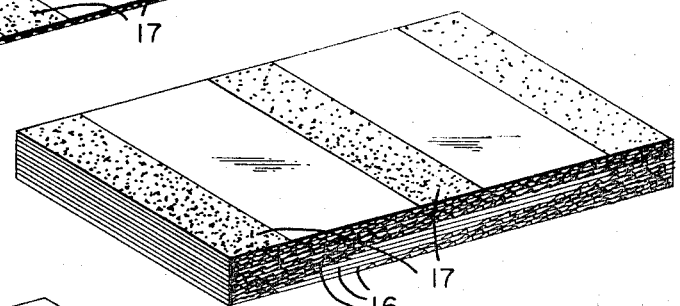
FIG__5
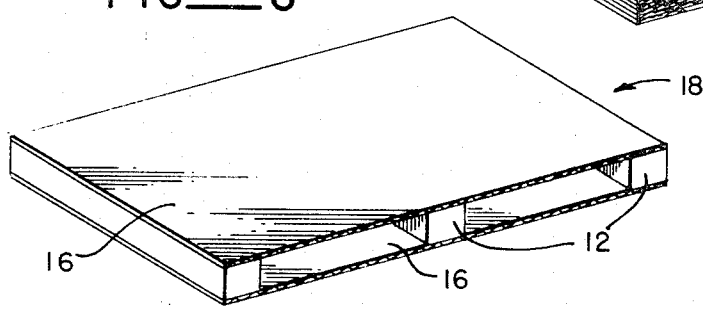
FIG__6
*INVENTOR.*
CARL J. REUSSER
BY
*ATTORNEYS*

United States Patent Office 3,556,886
Patented Jan. 19, 1971

3,556,886
PALLET BOARD USING POLYSTYRENE FOAM SPACERS BETWEEN CORRUGATED CARDBOARD
Carl J. Reusser, Seattle, Wash., assignor to Marine Commuter Corporation, Seattle, Wash., a corporation of Washington
Filed Apr. 25, 1968, Ser. No. 724,106
Int. Cl. B32b *31/00*
U.S. Cl. 156—265            2 Claims

ABSTRACT OF THE DISCLOSURE

A pallet board comprised of plastic foam spacers glued by pressure-sensitive adhesive between facings of corrugated cardboard, with the spacers and facings each factory-produced including the glue coatings and supplied to the customer separately in the size specified.

---

The invention relates to an improved light-weight disposable pallet fabricated by the used and composed of sheets of corrugated cardboard or similar flat sheet material which is glued by pressure-sensitive adhesive to spacers of polystyrene, polyurethane or other like or suitable foam material, with both the sheet material and the foam spacers being factory pre-formed to the size specified with the adhesive coating thereon, and to the method of producing the components of the pallet and the handling thereof for shipment and storage. The spacers may also be formed from honeycomb or other light-weight material. The object is to provide a light-weight disposable pallet which can be easily and quickly assembled by the user when the pallet is needed, and one particularly characterized in that the parts can be factory pre-formed, ready for instant use, and shipped unassembled to the user so as to reduced very materially the bulk size and hold to a minium the shipping cost and the cost of storing both at the point of manufacture and on the premises of the user.

This and other more particular objects and advantages of the invention will appear and be understood in the course of the following description and claims, the invention consisting in the novel construction, adaptation and combination of parts composing the pallet and in the new method of producing and handling these components.

In the accompanying drawings:

FIGS. 1 and 2 are fragmentary perspective views showing steps performed upon the pallet's spacer component in the factory-processing thereof.

FIG. 3 is a perspective view showing the manner in which the spacers are packaged for shipment to the user.

FIG. 4 is a fragmentary perspective view showing a processing step performed in course of producing the facings for the pallet.

FIG. 5 is a perspective view showing the packaging, for shipment, of said facings; and FIG. 6 is a perspectaive view illustrating an assembled pallet.

The adhesive which glues the facings to the spacers of the pallet is pressure-sensitive in character, which is to say that a dry film of the material applied to one surface will adhere to a dry-film thereof which is applied to another surface, but will not adhere to a non-coated surface. The adhesive which I find most desirable is a latex tape. Adhesives of this type are formulated with either a solvent or a water vehicle. It is important that the latter be used on polystyrene foam in that solvents attack and melt the plastic, A solvent-base latex-type adhesive is, however, cheaper and faster drying and inasmuch as a dried film (solvent base) will adhere to a dried water-based film, it is satisfactory to use the cheaper adhesive on the corrugated cardboard facings. Adhesives which are presently found to be the most suitable are Tereco #28, a product of Technical Research Company, of Seattle, Wash., and two products of H. B. Fuller Company, No. 3468 and No. U–962. There are undoubtedly adhesive products produced by other companies which are suitable for the intended use.

When applying the adhesive to the foam, the latter is in the form of boards 10, and this is to say that both the length and the breadth is considerable as compared with the thickness. The adhesive 11 is applied in a liquid state and so as to coat the entire surface of the upper and the lower face of the board, employing either a brush, roll, spray or dip method. Under normal conditions the adhesive dries in a period of 15 to 20 minutes and will then adhere to another dried coating.

The coated board is now cut into blocks or strips 12 of the specified spacer dimension. Either gang saws or knives are suitable for the purpose. It is to be borne in mind that some of the adhesive, during application of the coatings, will inherently have bled, as at 13, over edges of the board onto the side faces, and in the cutting step thin edgings 14 are trimmed off the sides of the board so that no lateral face remains onto which any of the adhesive has run. The side trimmings 14 are discarded, leaving a foam board divided into blocks or strips each having its top and its bottom face entirely coated, and its other four faces completely free of any adhesive. Without separating the same into its divided sections, the cut board is packaged for interim storage and later shipment to the customer. As indicated in FIG. 3, the package may be and usually is multi-level, i.e. contains a plurality of the cut boards of foam. Each level has its adhesive coating isolated from that of a next adjacent level by a separator sheet 15, usually waxed paper.

The corrugated cardboard sheets 16 which are to serve as pallet faces and between which the spacer blocks or strips are to be applied are factory-processed by applying adhesive 17 to one face only, either in continuous strips, as indicated in FIG. 4, or in equidistantly spaced spot applications. The cardboard facings are packaged and shipped to the customer, in the size specified, separate from the foam spacers. The two may be stored for periods of 90 days or more before being assembled to form the pallet 18 illustrated in FIG. 6.

If foam block spacers are used in lieu of strips, they may be formed from a sheet of foam which is 4' x 8' and 2" thick. If the blocks are to be 6" x 10", the top and bottom surface of the block will be coated with adhesive over an area of approximately 5" x 8". The adhesive will be applied and dried before cutting the full sheet into blocks and a space is provided between the adhesive patches to eliminate the problem of collecting adhesive on the saw or hot wire used to cut the sheet into blocks. If production techniques require, the blocks or strips may be coated with adhesive after they are cut to the desired size.

In some instances, it may be desired to assemble pallets wherein a single, top sheet of corrugated board is used to support the material on the pallet. In such constructions, similar strips or blocks will be used as spacers or supports and the adhesive will only be applied to one surface of the spacers.

While the invention is preferably practiced by applying adhesive coatings in the above manner, a pallet which admits to the here-described "in-plant" assembly could also conceivably use either a transfer adhesive tape such as 3M's Pressure Sensitive Tape #465 or Permacel #P-04, or a one-surface pressure-sensitive type of adhesive utilizing a release paper. Either of these procedures has the objection of being considerably more costly.

It is believed that the invention will have been clearly understood from the foregoing detailed description of my now-preferred illustrated embodiment. Changes in the details of construction may be resorted to without departing from the spirit of the invention and it is accordingly my intention that the hereto annexed claims be given the broadest interpretation to which the employed language fairly admits.

The embodiments of the invention in which an exclusive property or privilege is claimed are defined as follows:

1. A method of forming a pallet including a facing of stiff light-weight sheet material supported by spacers, which comprises forming a plastic foam board having substantially greater thickness than said stiff sheet material, applying a liquid coating of a latex type pressure-sensitive adhesive over the entire surface of at least one side of said board, after the coating has dried, cutting the board into multiple pieces to form said spacers each having adhesive applied to at least one surface thereof, applying a coating of an adhesive having adherence affinity for the first-named coating to one side for only of said sheet material, at the time place where the pallet is to be used assembling a sheet and a plurality of spacers into pallet relationship and by adherence of said adhesive coatings joining the sheet material to the spacers so that said spacers serve as support for the sheet material.

2. A method of forming a pallet as in claim 1 wherein the said adhesive coating ie applied to opposed sides of said spacers and a top and bottom sheet is caused to be joined to said spacers to form a two surface pallet.

References Cited

UNITED STATES PATENTS

| | | | |
|---|---|---|---|
| 1,754,784 | 4/1930 | Borsodi | 156—300X |
| 2,583,443 | 1/1952 | Perry et al. | 156—300X |
| 2,844,502 | 7/1958 | Paxton | 156—338X |
| 3,177,109 | 4/1965 | Ziegler | 156—264X |
| 3,302,593 | 2/1967 | Roberts | 108—56 |
| 3,300,403 | 4/1968 | Sullivan | 108—58XU |

BENJAMIN A. BORCHELT, Primary Examiner

D. A. BENT, Assistant Examiner

U.S. Cl. X.R.

108—51; 156—264